US012657610B2

(12) United States Patent
Gupta et al.

(10) Patent No.: US 12,657,610 B2
(45) Date of Patent: Jun. 16, 2026

(54) METHODS, SYSTEMS, AND MEDIA FOR PROVIDING DIGITAL ADVERTISERS WITH IMPROVED CONTEXT FOR DYNAMIC WEBPAGES

(71) Applicant: Integral Ad Science, Inc., New York, NY (US)

(72) Inventors: Vikram Gupta, Pune (IN); Karishma Agarwal, Pune (IN); Mahesh Nagargoje, Latur (IN); Sharad Pawar, Ahmednagar (IN); Vinay Gaykar, Pune (IN)

(73) Assignee: Integral Ad Science, Inc., New York, NY (US)

( * ) Notice: Subject to any disclaimer, the term of this patent is extended or adjusted under 35 U.S.C. 154(b) by 0 days.

(21) Appl. No.: 18/613,798

(22) Filed: Mar. 22, 2024

(65) Prior Publication Data

US 2025/0086552 A1     Mar. 13, 2025

Related U.S. Application Data

(60) Provisional application No. 63/454,876, filed on Mar. 27, 2023.

(51) Int. Cl.
G06Q 30/0241      (2023.01)
G06Q 10/0635      (2023.01)
(Continued)

(52) U.S. Cl.
CPC ..... G06Q 30/0277 (2013.01); G06Q 10/0635 (2013.01); G06Q 30/0185 (2013.01); G06Q 30/0275 (2013.01)

(58) Field of Classification Search
CPC ........... G06Q 30/0277; G06Q 10/0635; G06Q 30/0185; G06Q 30/0275
See application file for complete search history.

(56) References Cited

U.S. PATENT DOCUMENTS

2021/0097168 A1*   4/2021  Patel ..................... G06F 21/554
2021/0248624 A1*   8/2021  Keren .................. G06Q 50/184
2023/0118679 A1*   4/2023  Mayer ................ H04L 63/1433
                                                        707/706

OTHER PUBLICATIONS

"Phishing Website Classification and Detection Using Machine Learning" 2020 International Conference on Computer Communication and Informatics (ICCCI—2020), Jan. 22-24, 2020, Coimbatore, India (Year: 2020).*

* cited by examiner

*Primary Examiner* — Alexandru Cirnu
(74) *Attorney, Agent, or Firm* — Byrne Poh LLP

(57)          ABSTRACT

Methods, systems, and media for providing contextual information associated with webpages are provided. In some embodiments, the method comprises: receiving a plurality of risk tolerance values from a first advertiser; accessing a first webpage through a first universal resource locator (URL), wherein the first webpage contains at least one dynamic advertising region; determining, using a machine learning model, (i) that the first URL is a cybersquatting attempt of a second URL based on a comparison of a first domain name associated with the first URL and a second domain name associated with the second URL; (ii) a first plurality of sentiments associated with content items within the first webpage, a plurality of keywords associated with the first webpage, and a similarity score between the first plurality of sentiments and the plurality of keywords; and (iii) a plurality of sentiment risk scores, wherein a sentiment risk score for at least one sentiment in the first plurality of sentiment risk scores is based on searching an approval list using at least one of the first plurality of sentiments as a search query; based on determining that the first URL is the cybersquatting attempt of the second URL, modifying an aggregate risk score by a first value from the plurality of risk tolerance values; based on determining that the similarity score is (Continued)

below a similarity threshold, modifying the aggregate risk score by a second value from the plurality of risk tolerance values; based on the plurality of sentiment risk scores, modifying the aggregate risk score by a third value from the plurality of risk tolerance values; determining that the aggregate risk score is within a first range of predetermined values; and in response to determining that the aggregate risk score is within the first predetermined range of values, associating at least one of the first webpage or the first domain name associated with the first URL with an exclusion list associated with the first advertiser.

15 Claims, 5 Drawing Sheets

(51) Int. Cl.
    *G06Q 30/018*        (2023.01)
    *G06Q 30/0273*       (2023.01)

200

METHODS, SYSTEMS, AND MEDIA FOR PROVIDING DIGITAL ADVERTISERS WITH IMPROVED CONTEXT FOR DYNAMIC WEBPAGES

CROSS-REFERENCE TO RELATED APPLICATIONS

This application claims the benefit of U.S. Provisional Patent Application No. 63/454,876, filed Mar. 27, 2023, which is hereby incorporated by reference herein in its entirety.

TECHNICAL FIELD

The disclosed subject matter relates to methods, systems, and media for providing digital advertisers with improved context for dynamic webpages.

BACKGROUND

Digital advertising is included in many aspects of web content, such as display advertising on webpages, sponsored links to a brand's page in a search result, and video advertisements which play before, during, or after a video, as a few examples. Advertisers often place their advertising content in a digital advertising region based on prior information regarding the content on the webpage and/or video. Such prior information can be provided by an advertising network which auctions digital advertising placement or a platform which helps pair the advertiser content with a digital advertising region. The platform can scan a particular webpage and analyze the content, for example, of a blog post.

However, such platforms often overlook that webpage content can be created by anyone, and malicious actors are able to mimic the appearance and even content of genuine websites (e.g., websites for news outlets, etc.). For example, many fake news websites use web addresses and domain names that are similar to reputable news sources. When an advertiser inadvertently places advertising content on websites engaging in mimicry, the advertiser's brand image is put at risk.

Accordingly, it is desirable to provide new mechanisms for providing digital advertisers with improved context for dynamic webpages.

SUMMARY

Methods, systems, and media for providing contextual information associated with webpages are provided.

In accordance with some embodiments of the disclosed subject matter, a method for providing contextual information associated with webpages is provided, the method comprising: receiving a plurality of risk tolerance values from a first advertiser; accessing a first webpage through a first universal resource locator (URL), wherein the first webpage contains at least one dynamic advertising region; determining, using a machine learning model, (i) that the first URL is a cybersquatting attempt of a second URL based on a comparison of a first domain name associated with the first URL and a second domain name associated with the second URL; (ii) a first plurality of sentiments associated with content items within the first webpage, a plurality of keywords associated with the first webpage, and a similarity score between the first plurality of sentiments and the plurality of keywords; and (iii) a plurality of sentiment risk scores, wherein a sentiment risk score for at least one sentiment in the first plurality of sentiment risk scores is based on searching an approval list using at least one of the first plurality of sentiments as a search query; based on determining that the first URL is the cybersquatting attempt of the second URL, modifying an aggregate risk score by a first value from the plurality of risk tolerance values; based on determining that the similarity score is below a similarity threshold, modifying the aggregate risk score by a second value from the plurality of risk tolerance values; based on the plurality of sentiment risk scores, modifying the aggregate risk score by a third value from the plurality of risk tolerance values; determining that the aggregate risk score is within a first range of predetermined values; and in response to determining that the aggregate risk score is within the first predetermined range of values, associating at least one of the first webpage or the first domain name associated with the first URL with an exclusion list associated with the first advertiser.

In some embodiments, the method further comprises inhibiting the first advertiser from placing a bid for advertising in the at least one dynamic advertising region based on at least one of the first webpage or the first domain name being included on the exclusion list.

In some embodiments, determining whether the first URL is the cybersquatting attempt of the second URL further comprises determining that the first URL is missing a valid SSL certificate.

In some embodiments, the method further comprises inhibiting the first advertiser from placing a bid for advertising on a second webpage based on at least one of the first webpage and the domain name associated with the first URL being on the exclusion list, wherein the second webpage is accessed at a third URL, wherein the domain name associated with the first URL is identical to a domain name associated with the third URL.

In some embodiments, the method further comprises, based on at least one of the first webpage and the domain name associated with the first URL being on the exclusion list, adding the first plurality of sentiments associated with the first webpage and the first webpage to a training dataset for the machine learning model.

In some embodiments, the approval list comprises a database of web content that is approved by the first advertiser.

In accordance with some embodiments of the disclosed subject matter, a method for providing contextual information associated with webpages is provided, the method comprising: receiving a plurality of risk tolerance values from a first advertiser; accessing a first webpage through a first universal resource locator (URL), wherein the first webpage contains at least one dynamic advertising region; determining, using a machine learning model, (i) that the first URL is not a cybersquatting attempt of a second URL based on a comparison of a first domain name associated with the first URL and a second domain name associated with the second URL; (ii) a first plurality of sentiments associated with content items within the first webpage, a plurality of keywords associated with the first webpage, and a similarity score between the first plurality of sentiments and the plurality of keywords; and (iii) a plurality of sentiment risk scores, wherein a sentiment risk score for at least one sentiment in the first plurality of sentiment risk scores is based on searching a predetermined approval list using at least one of the first plurality of sentiments as a search query; based on determining that the first URL is not the cybersquatting attempt of the second URL, modifying an aggregate risk score by a first value from the plurality of risk tolerance values; based on determining that the similarity score is above a similarity threshold, modifying the aggregate risk score by a second value from the plurality of risk tolerance values; based on the plurality of sentiment risk scores, modifying the aggregate risk score by a third value from the plurality of risk tolerance values; determining that the aggregate risk score is within a first range of predetermined values; and in response to determining that the aggregate risk score is within the first predetermined range of values, associating at least one of the first webpage or the first domain name associated with the first URL with an approval list associated with the first advertiser.

In some embodiments, the method further comprises causing the first advertiser to place a bid for advertising in the at least one dynamic advertising region based on at least one of the first webpage or the first domain name being included on the approval list.

In some embodiments, determining whether the first URL is not the cybersquatting attempt of the second URL further comprises determining that the first URL has a valid SSL certificate.

In some embodiments, the method further comprises causing the first advertiser to place a bid for advertising on a second webpage based on at least one of the first webpage and the domain name associated with the first URL being on the approval list, wherein the second webpage is accessed at a third URL, wherein the domain name associated with the first URL is identical to a domain name associated with the third URL.

In some embodiments, the method further comprises, based on at least one of the first webpage and the domain name being on the approval list, adding the first plurality of sentiments associated with the first webpage and the first webpage to a training dataset for the machine learning model.

In some embodiments, the predetermined approval list comprises a database of web content that is approved by the first advertiser.

In accordance with some embodiments of the disclosed subject matter, a system for providing contextual information associated with webpages is provided, the system comprising a hardware processor that is configured to: receive a plurality of risk tolerance values from a first advertiser; access a first webpage through a first universal resource locator (URL), wherein the first webpage contains at least one dynamic advertising region; determine, using a machine learning model, (i) that the first URL is a cybersquatting attempt of a second URL based on a comparison of a first domain name associated with the first URL and a second domain name associated with the second URL; (ii) a first plurality of sentiments associated with content items within the first webpage, a plurality of keywords associated with the first webpage, and a similarity score between the first plurality of sentiments and the plurality of keywords; and (iii) a plurality of sentiment risk scores, wherein a sentiment risk score for at least one sentiment in the first plurality of sentiment risk scores is based on searching an approval list using at least one of the first plurality of sentiments as a search query; based on determining that the first URL is the cybersquatting attempt of the second URL, modify an aggregate risk score by a first value from the plurality of risk tolerance values; based on determining that the similarity score is below a similarity threshold, modify the aggregate risk score by a second value from the plurality of risk tolerance values; based on the plurality of sentiment risk scores, modify the aggregate risk score by a third value from the plurality of risk tolerance values; determine that the aggregate risk score is within a first range of predetermined values; and in response to determining that the aggregate risk score is within the first predetermined range of values, associate at least one of the first webpage or the first domain name associated with the first URL with an exclusion list associated with the first advertiser.

In accordance with some embodiments of the disclosed subject matter, a computer-readable medium containing computer executable instructions that, when executed by a processor, cause the processor to perform a method for providing contextual information associated with webpages is provided, the method comprising: receiving a plurality of risk tolerance values from a first advertiser; accessing a first webpage through a first universal resource locator (URL), wherein the first webpage contains at least one dynamic advertising region; determining, using a machine learning model, (i) that the first URL is not a cybersquatting attempt of a second URL based on a comparison of a first domain name associated with the first URL and a second domain name associated with the second URL; (ii) a first plurality of sentiments associated with content items within the first webpage, a plurality of keywords associated with the first webpage, and a similarity score between the first plurality of sentiments and the plurality of keywords; and (iii) a plurality of sentiment risk scores, wherein a sentiment risk score for at least one sentiment in the first plurality of sentiment risk scores is based on searching a predetermined approval list using at least one of the first plurality of sentiments as a search query; based on determining that the first URL is not the cybersquatting attempt of the second URL, modifying an aggregate risk score by a first value from the plurality of risk tolerance values; based on determining that the similarity score is above a similarity threshold, modifying the aggregate risk score by a second value from the plurality of risk tolerance values; based on the plurality of sentiment risk scores, modifying the aggregate risk score by a third value from the plurality of risk tolerance values; determining that the aggregate risk score is within a first range of predetermined values; and in response to determining that the aggregate risk score is within the first predetermined range of values, associating at least one of the first webpage or the first domain name associated with the first URL with an approval list associated with the first advertiser.

In accordance with some embodiments of the disclosed subject matter, a system for providing contextual information associated with webpages is provided, the system comprising: means for receiving a plurality of risk tolerance values from a first advertiser; means for accessing a first webpage through a first universal resource locator (URL), wherein the first webpage contains at least one dynamic advertising region; means for determining, using a machine learning model, (i) that the first URL is not a cybersquatting attempt of a second URL based on a comparison of a first domain name associated with the first URL and a second domain name associated with the second URL; (ii) a first plurality of sentiments associated with content items within the first webpage, a plurality of keywords associated with the first webpage, and a similarity score between the first plurality of sentiments and the plurality of keywords; and (iii) a plurality of sentiment risk scores, wherein a sentiment risk score for at least one sentiment in the first plurality of sentiment risk scores is based on searching a predetermined approval list using at least one of the first plurality of sentiments as a search query; means for modifying an aggregate risk score by a first value from the plurality of risk tolerance values based on determining that the first URL is not the cybersquatting attempt of the second URL; means for modifying the aggregate risk score by a second value from the plurality of risk tolerance values based on determining that the similarity score is above a similarity threshold; means for modifying the aggregate risk score by a third value from the plurality of risk tolerance values based on the plurality of sentiment risk scores; means for determining that the aggregate risk score is within a first range of predetermined values; and means for associating at least one of the first webpage or the first domain name associated with the first URL with an approval list associated with the first advertiser in response to determining that the aggregate risk score is within the first predetermined range of values.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
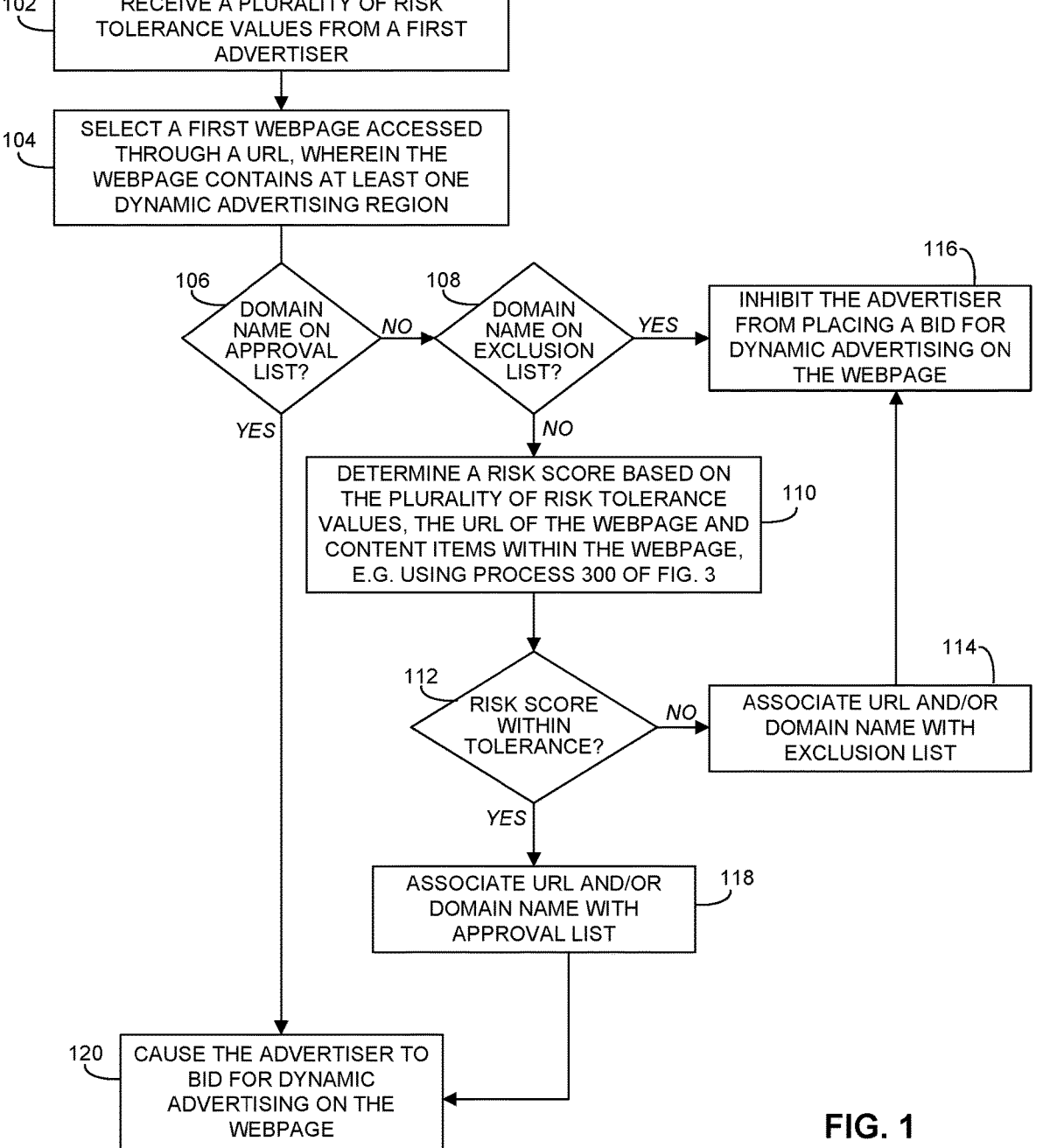
FIG. 1 is an example flow diagram of a method for providing digital advertisers with improved context for dynamic webpages in accordance with some embodiments of the disclosed subject matter.

In accordance with various embodiments of the disclosed subject matter, mechanisms (which can include methods, systems, and media) for providing digital advertisers with improved context for dynamic webpages are provided.

Webpages, internet-connected applications, and many other types of web content allow digital advertisements. For example, a website that hosts blogs can have templates that automatically populate regions of the displayed webpage with advertisements. Many companies use digital advertising as a part of their overall marketing strategy, and different platforms exist that can sell the available digital advertising regions (such as blog pages) to advertisers. Webpages are regularly analyzed by such platforms to find advertisers whose products and/or services match the interests of individuals likely to visit the webpage. Such analysis is often performed by capturing or identifying the main content of the webpage, such as the text and images used in a blog post or article.

However, certain websites can exist for a malicious purpose, such as to spread disinformation, promote fake news, and/or attempt illicit data collection such as phishing attempts. A common strategy for such websites is to use a web address and/or URL which closely resembles a website where users often visit. Such behavior can be collectively termed, "cybersquatting." A brand can suffer losses to their reputation and customer base when a brand unknowingly places digital advertisements on a cybersquatting website. During the bidding process for digital advertising regions, it is often difficult to determine whether the advertising region is located on a webpage that is part of a cybersquatting attack. Therefore, it is advantageous to provide advertisers with improved mechanisms to provide advertisers with improved context for dynamic webpages, particularly with respect to the safety of the URL where the dynamic content is located.

A common type of cybersquatting is typo squatting, wherein the URL includes mistakes such as a common misspelling of the intended site, a misspelling based on a typographical error, a plural of a singular domain name, a different top-level domain: (i.e. .com instead of .org), an abuse of the Country Code Top-Level Domain (ccTLD) (.cm, .co, or .om instead of .com). Another type of cybersquatting is registering a doppelganger domain, wherein punctuation is slightly altered (e.g., omitting or inserting a period), and/or appending arbitrary word(s) that appear legitimate. Yet another type of cybersquatting is a homograph attack, wherein a particular character in a URL is replaced with a different character that looks very similar. Examples of homograph attacks can also extend to using alternative character sets (e.g., Cyrillic letters instead of Latin letters) in order for the "imposter" URL to appear legitimate. Yet another cybersquatting attack is a Punycode-based attack which substitutes a character from one font with a similar looking character from a second font. when the URL is displayed in a browser bar (e.g., stylized in a particular font), the URL appears legitimate, but the URL as registered could simply include a string referencing ASCII characters.

Yet another type of cybersquatting is website spoofing, where a malicious actor has created a website that purposely mimics a website created by a different person or organization. In some instances, a cybersquatting website can be an obvious parody of a news organization, with the website operator having little ill intent other than social commentary. However, in other instances, a website spoofing attack can display information purporting to be from a well-known news organization.

Note that although many types of cybersquatting have been described above, any additional types of cybersquatting can be included in the mechanisms as described below.

In some embodiments, the mechanisms can receive a plurality of risk tolerance values from a first advertiser, for example, through any suitable user interface. In some embodiments, the mechanisms can access a first webpage through a first universal resource locator (URL), where the first webpage contains at least one dynamic advertising region.

In some embodiments, the mechanisms can use any suitable machine learning model to determine whether the first URL is a cybersquatting attempt of a second URL. For example, in some embodiments, the mechanisms can compare the domain name associated with the first URL to any suitable URL and/or list of URLs, such as a list of known cybersquatting URLs. In another example, in some embodiments, the mechanisms can determine whether the first URL has a valid identity certificate (e.g., SSL certificate).

In some embodiments, the mechanisms can also use the machine learning model to analyze content and/or keywords associated with the first webpage. In some embodiments, the machine learning model can determine a first plurality of sentiments associated with content in the webpage (e.g., sentiments of an article) and can additionally determine keywords used to describe content associated with the webpage. In some embodiments, the machine learning model can determine any suitable similarity score using any suitable similarity measure (e.g., cosine similarity) between the plurality of sentiments and plurality of keywords.

In some embodiments, the mechanisms can also use the machine learning model to determine a plurality of sentiment risk scores. In some embodiments, a sentiment risk score can be determined based on searching an approved list of URLs (and/or the content associated with the URLs) for any one of the sentiments determined for the webpage.

In some embodiments, the mechanisms can utilize an aggregate risk score for the webpage. For example, in some embodiments, based on whether the first URL is a cybersquatting attempt, the mechanisms can modify the aggregate risk score using a first risk tolerance value. In another example, in some embodiments, based on determining that the similarity score (between the plurality of sentiments and plurality of keywords) is below a similarity threshold, the mechanisms can modify the aggregate risk score using a second risk tolerance value. In yet another example, based on the plurality of sentiment risk scores, the mechanisms can modify the aggregate risk score using a third risk tolerance value.

In some embodiments, the mechanisms can determine the aggregate risk score is within a first range of predetermined values and can associate at least one of the first webpage or the first domain name associated with the first URL with an exclusion list associated with the first advertiser.

In some embodiments, based on the first webpage and/or a domain name associated with the first URL being listed on the exclusion list associated with the first advertiser, the mechanisms can cause any suitable additional actions to occur. For example, in some embodiments, the mechanisms can inhibit the first advertiser from placing a bid for advertising on the first webpage. Additionally, in some embodiments, the mechanisms can inhibit the first advertiser from placing a bid for advertising on a second webpage that has an identical domain name to a domain name which is included on the exclusion list.

In some embodiments, the mechanisms can train the machine learning model using any suitable dataset, such as a dataset of webpages and/or URLs that have previously been added to the exclusion list as determined by the mechanisms as described above.

Thus, a pre-bid solution can be described herein that can provide advertisers with additional context regarding the validity of the website where an advertiser is considering placing advertising content.

Turning to FIG. 1, an example flow diagram of an illustrative process 100 for providing digital advertisers with improved context for dynamic webpages in accordance with some embodiments of the disclosed subject matter is shown. In some embodiments, process 100 can be executed on any suitable device, such as server 402 and/or user devices 406 as discussed below in connection with FIG. 4. In some embodiments, process 100 can be executed based on any suitable criteria, such as an advertiser using a digital advertising platform to plan and/or launch a digital advertising campaign across many websites.

As shown, process 100 can begin at block 102 in some embodiments when a server and/or user device receives a plurality of risk tolerance values from an advertiser. For example, an advertiser can submit (e.g., through any suitable user interface) any suitable numeric value for each of the following risk categories:

1) URL regularity
2) Valid security ID
3) Content matching keywords
4) Content matching library of similar content
5) Overall risk In some embodiments, process 100 can receive the risk tolerance values at block 102 as a series of individual numbers ranging from a minimum value (e.g., "0") to a maximum value (e.g., "10"), where the minimum value conveys the least risk and the maximum value conveys the most risk. In some embodiments, process 100 can alternatively receive the risk tolerance values as a series of weights, as an ordered list (e.g., most important to least important), and/or any other suitable representation.

Continuing to block 104, in some embodiments, process 100 can select a web location, such as a web address, webpage, website, and/or any other web location that has an associated universal resource locator (URL) 202 ("http://www.example.com/index.html"), as described below in FIG. 2. Note that, in some embodiments, process 100 can select a web location that corresponds to an application, a video, and/or any other suitable type of web-hosted content that has an associated URL. In some embodiments, process 100 can select a URL from a set of URLs that have available digital advertising space within an advertising network.

In some embodiments, process 100 can continue to block 106, where process 100 can reference an approval list associated with the advertiser which submitted the risk tolerance values at block 102. In some embodiments, the approval list associated with the advertiser can be empty, and/or populated with values (e.g., data including the URL, and/or any other suitable data) as a result of a prior instance of process 100 and/or any other suitable process.

In some embodiments, process 100 can check the approval list for a first host name and/or domain name which matches a second host name and/or domain name present in the URL selected at block 104. In some embodiments, process 100 can require an exact match between the first host name and/or domain name and the second host name and/or domain name. For example, in some embodiments, at block 104, process 100 can select URL 202 ("http://www.example.com/index.html") which has a domain name of "example.com" Continuing this example, in some embodiments, when process 100 checks the approval list at block 106, process 100 would not return a match between "example.com" and "example.org", as there is a difference in top-level domain (e.g., ".com" vs. ".org"). As another example, a comparison between "example.com" and "example.co" would not return a match although the first top-level domain (".com") contains the second top-level domain within it (".co"). As yet another example, a comparison between a first URL of "http://www.example.com/index.html" and "http://www.example.com/test.html" would return an exact match, as each webpage references a file ("index.html" and "test.html", respectively) that can be found at the domain "www.example.com".

In some embodiments, process 100 can return an exact match between the domain name of the URL received at block 104 and the approval list checked at block 106. In some embodiments, process 100 can additionally reference any other suitable values and/or information stored in the approval list, such as a series of risk tolerance values and/or scores that were used and/or determined when the second host name and/or domain name was added to the approval list, as mentioned below in connection with block 118.

In some embodiments, at block 106, process 100 can determine if the series of risk tolerance values received at block 102 are substantially similar to any risk tolerance values stored in association with the exact match of the host name and/or domain name associated with the URL selected at block 104.

In some embodiments, when process 100 determines at block 106 that there is an exact match to the domain name and that the series of risk tolerance values are substantially similar, process 100 can continue to block 120.

In some embodiments, at block 120, process 100 can cause the advertiser to place a bid on a digital advertisement associated with the webpage.

In some embodiments, when process 100 determines an exact match at block 106 and additionally determines that the series of risk tolerance values are not substantially similar to any risk tolerance values stored in association with the exact match of the host name and/or domain name, process 100 can continue to block 108.

In some embodiments, at block 108, process 100 can reference an exclusion list associated with the advertiser which submitted the risk tolerance values at block 102. In some embodiments, the exclusion list associated with the advertiser can be empty, and/or populated with values (e.g., data including the URL, and/or any other suitable data) as a result of a prior instance of process 100 and/or any other suitable process.

In some embodiments, process 100 can check the exclusion list for a first host name and/or domain name which matches a second host name and/or domain name present in the URL selected at block 104. In some embodiments, process 100 can require an exact match between the first host name and/or domain name and the second host name and/or domain name. For example, in some embodiments, at block 104, process 100 can select URL 202 ("http://www.example.com/index.html") which has a domain name of "example.com". Continuing this example, in some embodiments, when process 100 checks the exclusion list at block 108, process 100 would not return a match between "example.com" and "example.org", as there is a difference in top-level domain (e.g., ".com" vs. ".org"). As another example, a comparison between "example.com" and "example.co" would not return a match although the first top-level domain (".com") contains the second top-level domain within it (".co"). As yet another example, a comparison between a first URL of "http://www.example.com/index.html" and "http://www.example.com/test.html" would return an exact match, as each webpage references a file ("index.html" and "test.html", respectively) that can be found at the domain "www.example.com".

In some embodiments, process 100 can return an exact match between the URL received at block 104 and the approval list checked at block 108. In some embodiments, based on the exact match to the exclusion list, process 100 can additionally reference any other suitable values and/or information stored in the exclusion list, such as a series of risk tolerance values and/or scores that were used and/or determined when the second host name and/or domain name was added to the exclusion list, as mentioned below in connection with block 114.

In some embodiments, at block 108, process 100 can determine if the series of risk tolerance values received at block 102 are approximately equal to any risk tolerance values stored in association with the exact match of the host name and/or domain name associated with the URL selected at block 104.

In some embodiments, when process 100 determines at block 108 that there is an exact match and that the series of risk tolerance values are approximately equal, process 100 can continue to block 116.

In some embodiments, process 100 can continue to block 116 where process 100 can inhibit the advertiser from placing a bid on a digital advertisement region associated with the webpage.

In some embodiments, when process 100 determines an exact match at block 108 and additionally determines that the series of risk tolerance values are not approximately equal to any risk tolerance values stored in association with the exact match of the host name and/or domain name, process 100 can continue to block 110.

In some embodiments, at block 110, process 100 can determine a series of risk scores for an advertiser to place a digital advertisement in at least one of the dynamic advertising regions associated with the webpage. In some embodiments, process 100 can use at least one of the values in the plurality of risk tolerance values received at block 102. In some embodiments, determining the series of risk scores can include executing any suitable sub-processes, such as process 300 as described below in connection with FIG. 3.

For example, in some embodiments, at block 110, process 100 can determine the validity of the URL selected at block 104. As a particular example, as described below in connection with FIG. 3, process 100 can use a pattern-matching machine learning model to determine whether the URL associated with the web location is an "original" URL or an "imposter" URL, that is, a URL attempting a cybersquatting attack. In some embodiments, process 100 can use a first risk tolerance value from the plurality of risk tolerance values as a weight in the determination of the risk regarding the validity of the URL. As another particular example, as described below in connection with FIG. 3, process 100 can examine the webpage for a valid identity certificate, such as a Secure Sockets Layer (SSL) and/or Transport Layer Security (TLS) certificate. In some embodiments, process 100 can use a second risk tolerance value from the plurality of risk tolerance values when a valid identity certificate is not identified.

In another example, in some embodiments, at block 110, process 100 can compare content found at the webpage associated with the URL selected at block 104 to keywords associated with URL selected at block 104 and/or associated webpage. As a particular example, as described below in connection with FIG. 3, process 100 can determine a similarity score between a) sentiments in the content found at the webpage and b) keywords associated with the URL. A similarity score, such as a cosine similarity score, can indicate a probability that the sentiments are similar to the keywords. In some embodiments, any suitable similarity score can be used, such as a correlation, cosine similarity, Jaccard similarity, Euclidian distance, etc. In some embodiments, process 100 can use a third risk tolerance value from the plurality of risk tolerance values as a weight in combination with the comparison of content and keywords.

In yet another example, in some embodiments, as described below in connection with FIG. 3, process 100 can determine a sentiment risk score for the web location based on scoring sentiments from content associated with the web location to a plurality of webpages. In some embodiments, process 100 can use a fourth risk tolerance value from the plurality of risk tolerance values in combination with the determined sentiment risk score.

In some embodiments, an aggregate risk score can be determined at block 110 of process 100, for example using any suitable combination of individual risk scores as discussed above. In some embodiments, any suitable subprocess (such as process 300) can return an aggregate risk score at block 110 as part of the execution of the subprocess, such as the cumulative risk determined at block 328 of process 300 as discussed below.

In some embodiments, at block 112, process 100 can compare the aggregate risk score to a threshold. In some embodiments, the threshold can be any suitable numeric value (e.g., "0.5", "0.75", etc.) that is set by the advertiser that is requesting the contextual advertising analysis. In some embodiments, the threshold can be included in the plurality of risk tolerance values received at block 102. In some embodiments, the threshold can be a first range of predetermined values included in the plurality of risk tolerance values received at block 102. In some embodiments, the threshold received in the plurality of risk tolerance values can be a textual indicator of relative risk, e.g., a "high" threshold or a "low" threshold, and process 100 can determine any suitable mapping from a textual indicator to a numeric value of the threshold.

In some embodiments, at block 112, process 100 can determine that the aggregate risk score is outside the risk tolerance value(s) indicated by the advertiser (e.g., does not fall within the first range of predetermined values) and can continue to block 114.

In some embodiments, at 114, process 100 can determine that the webpage, website, URL, and/or domain name contained in the URL for the webpage (or any combination thereof) selected at block 104 is not brand-safe for the advertiser that provided the plurality of risk tolerance values. In some embodiments, at 114, process 100 can associate the webpage, website, URL, and/or domain name contained in the URL for the webpage (or any combination thereof) selected at block 104 with an advertising exclusion list for the advertiser. In some embodiments, process 100 can determine that the webpage, website, and/or domain name contained in the URL for the webpage (or any combination thereof) was previously associated with an advertising approval list for the advertiser, (e.g., from a previous instance of process 100) and can additionally remove the webpage, website, and/or domain name contained in the URL for the webpage (or any combination thereof) from the advertising approval list for the advertiser.

In some embodiments, process 100 can continue to block 116 where process 100 can inhibit the advertiser from placing a bid on a digital advertisement region associated with the webpage.

Alternatively, in some embodiments, at block 112, process 100 can determine that the aggregate risk score is within the risk tolerance value(s) indicated by the advertiser (e.g., within the first range of predetermined values) and can continue to block 118.

In some embodiments, at 118, process 100 can determine that the webpage, website, URL, and/or domain name contained in the URL for the webpage (or any combination thereof) selected at block 104 is brand-safe for the advertiser that provided the plurality of risk tolerance values. In some embodiments, at block 118, process 100 can associate the webpage, website, URL and/or domain name contained in the URL for the webpage (or any combination thereof) with an advertising approval list for the advertiser. In some embodiments, process 100 can determine that the webpage, website, and/or domain name contained in the URL for the webpage selected at block 104 (or any combination thereof) was previously associated with an advertising exclusion list for the advertiser, (e.g., from a previous instance of process 100) and can additionally remove the webpage, website, and/or domain name contained in the URL for the webpage (or any combination thereof) from the advertising exclusion list for the advertiser.

In some embodiments, at block 120, process 100 can cause the advertiser to place a bid on a digital advertisement region associated with the webpage.

Figure 2:
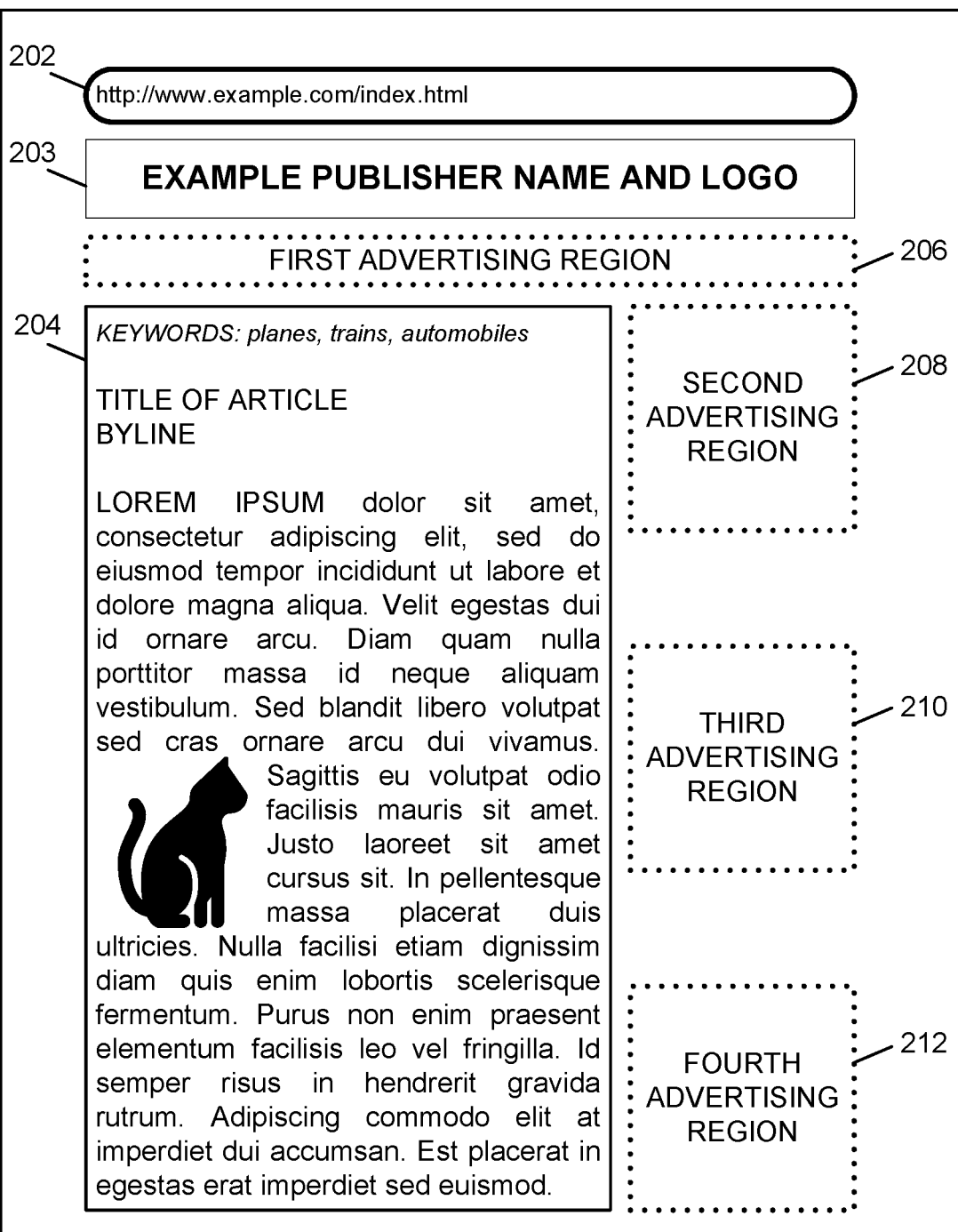
FIG. 2 is an illustrative webpage containing dynamic advertising regions in accordance with some embodiments of the disclosed subject matter.

Turning to FIG. 2, an illustrative webpage 200 containing dynamic advertising regions in accordance with some embodiments of the disclosed subject matter is shown. In some embodiments, webpage 200 can be assigned a web address 202 and can contain a header 203, webpage content 204, and advertising regions 206-212.

In some embodiments, webpage 200 can be displayed on any suitable device, such as display devices 512 of servers 402 and/or user devices 406. In some embodiments, webpage 200 can be found by accessing web address 202, and can contain a header 203, webpage content 204, and advertising regions 206-212 can be determined based on the type of device (e.g., desktop computer with monitor, mobile phone, etc.) used to access webpage 200. In some embodiments, any suitable additional elements can be included in webpage 200, such as login prompts, navigation tabs, navigation links, image carousels, etc.

In some embodiments, web address 202 can have any suitable syntax (e.g., universal resource identifier, URI and/or universal resource locator, URL) and can, for example, include a protocol, a hostname, a domain name, a directory, a filename, and/or a path. For example, as shown in FIG. 2, web address 202 can include "http" as the application layer protocol, "www.example.com" as the hostname, "example-.com" as the domain name, wherein "example" is the second-level domain and ".com" is the top-level domain, and a page name of "index.html", wherein the extension "html" indicates a file extension for a file named "index". In some embodiments, web address 202 can include any suitable characters, such as ASCII, Unicode, and/or any other suitable characters.

In some embodiments, web address 202 can include any suitable top-level domain, such as original top-level domains (e.g., ".com," ".org," ".net," ".edu," ".gov,", etc.), geographic top-level domains (e.g., ".asia," ".paris," ".nyc," ".kiwi," etc.), branded top-level domains (e.g., ".amazon," ".amex," ".apple," ".fedex," ".lego," ".pfizer," etc.), where the sequence of letters and/or characters in the top-level domain correspond to a brand name.

In some embodiments, web address 202 can include any suitable second-level domain. For example, in some embodiments, the second-level domain of web address 202 can include a string of characters that contains a brand name.

In some embodiments, header 203 can include any suitable content, such as a brand name, brand logo, and/or any other suitable text and/or imagery. In some embodiments, header 203 can be used to identify an organization that is publishing content on webpage 200.

In some embodiments, webpage content 204 can include any suitable arrangement and/or layout of text, imagery, static and/or interactive graphics (e.g., charts, graphs, maps, etc.), audio, video, and/or other web design content (e.g., navigation menus, pop-ups, scroll animation, selectable icons, text-entry forms, log-in container, search bar, etc.), and/or any suitable combination thereof. For example, webpage content 204 can include a blog post and can include a heading section and a main body section, where the heading section is a first typeface and the main body is a second typeface. In another example, in some embodiments, webpage content 204 can include embedded images such as a photograph and/or a series of photographs in any suitable container (e.g., slideshow, carousel, etc.). In another example, in some embodiments, webpage content 204 can include a video player and can start playback of the video content at any suitable time, including auto-playing when a user scrolls past the video player.

In some embodiments, webpage 200 can include any suitable quantity of advertisements, such as advertising regions 206-212. In some embodiments, first advertising region 206 can be a banner advertisement and can be located in any suitable position on webpage 200. In some embodiments, second, third, and fourth advertising regions 208, 210, and 212 (respectively) can be positioned in a column adjacent to webpage content 204, such that a person viewing web address 202 would see content placed in the fourth advertising region 212 after scrolling through the webpage.

In some embodiments, advertising regions 206-212 can be configured to display advertising content, such as images with text and/or visual content that is created to give a particular brand association. For example, in some embodiments, a name of a company and a logo can appear in any one of the advertising regions 206-212.

In some embodiments, advertising regions 206-212 can be configured to display advertising content that can be updated and/or changed dynamically. That is, in some embodiments, advertising regions 206-212 can be dynamic advertising regions. For example, in some embodiments, advertising regions 206-212 can be configured to refresh the content in each advertising region with each refresh of webpage 200, as indicated by a browser and/or application that is used to access webpage 200. In another example, in some embodiments, advertising regions 206-212 can be configured to refresh the content in the respective advertising region after being viewed for any suitable duration (e.g., 1 second, 5 seconds, 10 seconds, etc.). In this example, any suitable mechanism can be used to determine advertisement view duration. In yet another example, in some embodiments, advertising regions 206-212 can be configured to display in the respective advertising region based on any suitable user behavior, such as scrolling a certain amount of the webpage, hovering in any particular spot within webpage 200, etc.

In some embodiments, the dynamic features of advertising regions 206-212 can receive advertising content (e.g., display advertisements) from any suitable mechanism. For example, in some embodiments, a domain associated with hosting webpage 200 can provide advertising content to webpage 200. In another example, advertising regions 206-212 can receive content from an advertising network.

Figure 3:
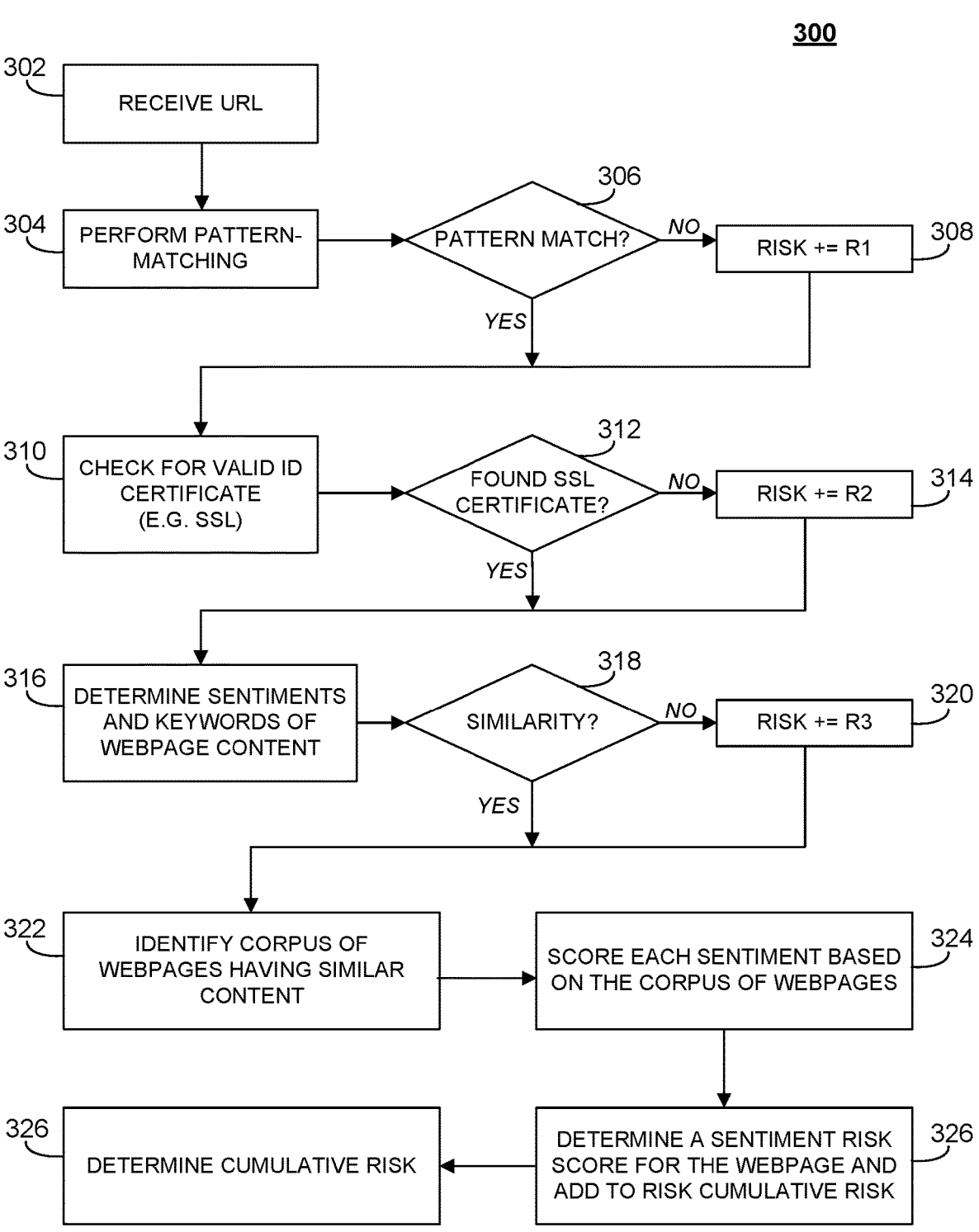
FIG. 3 is an example flow diagram of a method for determining a cumulative risk score for a webpage in accordance with some embodiments of the disclosed subject matter.

Turning to FIG. 3, an example flow diagram of an illustrative process 300 for determining a cumulative risk score for a webpage in accordance with some embodiments of the disclosed subject matter is shown. In some embodiments, process 300 can be executed on any suitable device, such as server 402 and/or user devices 406 as discussed below in connection with FIG. 4. In some embodiments, any suitable computation models can be used to execute process 300. For example, in some embodiments, a machine-learning model with any suitable components (e.g., natural language processing, etc.) can be trained on any suitable dataset (e.g., high risk webpage URLs) and can execute process 300.

In some embodiments, process 300 can be executed as a sub-process of any other suitable process, such as process 100 as described above in connection with FIG. 1. In some embodiments, process 300 can begin at block 302 when process 300 receives a webpage URL.

In some embodiments, at block 304, process 300 can continue by performing pattern-matching on at least a part of the webpage URL. That is, in some embodiments, process 300 can parse the URL into components such as a top level domain, a second level domain, a hostname, a file path, etc. In some embodiments, process 300 can compare the URL components and can determine whether any of the components contain misspellings of common words (e.g., typographical errors, plurals, etc.) and/or alternate spellings of common brand names and/or companies. In some embodiments, the URL and/or separated components of the URL can be inspected against any suitable rule-set to determine whether the URL is a cybersquatting attack (e.g., "imposter" URL) against any other suitable URL.

In some embodiments, at block 306, process 300 can continue by determining whether the URL received at block 302 is an "imposter" or an "original" URL. For example, in some embodiments, process 300 can determine, using the output of the pattern matching from block 304, that the URL contains segments that are irregular or known to be associated with "impostor" URLs and can continue to block 308.

At block 308, process 300 can add to a cumulative risk score. For example, in some embodiments, process 300 can add a value of "R1", which can be set by any suitable mechanism such as at a user interface discussed above in connection with block 102 of process 100 and FIG. 1.

Alternatively, in some embodiments, at block 306, process 300 can determine that the URL contains an "original" domain name and can continue to block 310. That is, in some embodiments, an "original" domain name can be considered a domain name where a browser navigating to the domain indicated in the URL will be directed to a webpage that contains, for example, informative articles written and/or produced by a company, individual, organization and/or any other entity indicated in at least a part of the URL domain name.

In some embodiments, when process 300 determines that the URL contains an "original" domain name at block 308, process 300 can add a default value to the cumulative risk score before continuing to block 310. For example, in some embodiments, process 300 can add a value of "0", "1", and/or any predetermined value which indicates that the URL carries a lower risk than the value used in block 308 of process 300. In some embodiments, the default value used by process 300 can additionally be set by any suitable mechanism such as at a user interface discussed above in connection with block 102 of process 100 and FIG. 1.

In some embodiments, process 300 can continue to block 310. In some embodiments, at block 310, process 300 can inspect the webpage associated with the URL received at 302 for a valid identity certificate (e.g., TLS, SSL, etc.).

In some embodiments, at block 312, process 300 can determine that the webpage does not have a valid identity certificate and can continue to block 314.

At block 314, in some embodiments, process 300 can add to a cumulative risk score. For example, in some embodiments, process 300 can add a value of "R2", which can be set by any suitable mechanism such as at a user interface discussed above in connection with block 102 of process 100 and FIG. 1.

Alternatively, in some embodiments, at block 312, process 300 can determine that the webpage does have a valid identity certificate and can continue to block 316. In some embodiments, at block 312, process 300 can add a default value to the cumulative risk score before continuing to block 316. For example, in some embodiments, process 300 can add a value of "0", "1", and/or any predetermined value which indicates that the URL carries a lower risk than the value used in block 314 of process 300. In some embodiments, the default value used by process 300 can additionally be set by any suitable mechanism such as at a user interface discussed above in connection with block 102 of process 100 and FIG. 1.

In some embodiments, at block 316, process 300 can determine a plurality of sentiments for the webpage content, and can additionally determine a plurality of keywords associated with the webpage and/or webpage content.

In some embodiments, process 300 can determine a plurality of sentiments at block 316 using any suitable mechanism. For example, process 300 can use a natural-language processing (NLP) model and/or algorithm, wherein process 300 uses text on the webpage (e.g., webpage content 204) as input to the NLP model. Continuing this example, in some embodiments, the NLP model can output one or more words, phrases, and/or short sentences that reflect the main sentiments of the webpage content. In some embodiments, the NLP model output can be a summarization of the webpage content. In some embodiments, the NLP model can additionally detect a language (e.g., English, German, Mandarin, Korean, etc.) that the webpage content is written in, and can additionally output sentiments in the same language, a different language, and any combination thereof.

In some embodiments, sentiments can include specific object(s) and/or activities included in the webpage content (e.g., "politics", "local museums", "real estate", etc.), general tone and/or emotions expressed in the content (e.g., "angry", "educational", "persuasive", etc.), and/or any other suitable types of words or phrases. As a particular example, in some embodiments, a particular webpage can contain an article that includes a story regarding how a recipe for sourdough bread was passed down through a family, and can additionally the recipe for the sourdough bread at the end of the article. In this particular example, process 300 can determine that the sentiments of the webpage content include: {"breadmaking", "family tradition", "recipe", "dough", and "sourdough"}.

In some embodiments, process 300 can determine, at block 316, that the webpage content includes visual content such as photos, images, drawings, short animations, and/or videos. In some embodiments, process 300 can use any suitable mechanism, such as image recognition, object tracking, and/or any other suitable machine-learning image analysis technique, to determine sentiments for the visual content included in the webpage content. For example, in some embodiments, process 300 can identify one or more objects in the visual content (e.g., person standing, dog running, soft drink with a brand name and/or logo displayed in the image). In another example, in some embodiments, process 300 can classify the displayed image using subjective qualities (e.g., "positive", "neutral", "negative") and/or using topical keywords (e.g., "beach", "apparel sale", etc.) based on the imagery and/or text that appears in the image. In some embodiments, process 300 can determine any suitable quantity of sentiments and can associate the sentiments determined for visual content with any additional sentiments, e.g., sentiments determined for the text portion of the webpage content.

In some embodiments, at block 316, process 300 can additionally determine keywords associated with the webpage and/or webpage content. For example, in some embodiments, process 300 can identify metadata within the webpage design (e.g., HTML, Javascript, etc.) that includes tags and/or keywords. In another example, in some embodiments, process 300 can identify a location on the webpage that contains a series of words, phrases, or short sentences and can assign the identified series of words, phrases, and/or short sentences to be keywords for the webpage. For example, in some embodiments, as shown in FIG. 2, webpage content 204 contains a section of text above the content title ("TITLE OF ARTICLE") that uses a different font type than the text below the content title, and which is additionally labeled "keywords" followed by three descriptors ("planes", "trains", "automobiles). In this example, in some embodiments, process 300 can identify the three descriptors as keywords for the webpage content.

In some embodiments, at block 316, process 300 can identify keywords for the webpage content in any suitable location within the webpage content, webpage design and/or coding, and/or the URL itself. For example, in some embodiments, a file path within the URL can identify the page name for a file which stores the webpage content on a server. In some embodiments, process 300 can use at least a portion of the file path in the URL within the keywords and/or sentiments identified at block 316.

In some embodiments, at block 318, process 300 can determine a similarity score between the plurality of sentiments and the plurality of keywords, each determined at block 316. In some embodiments, process 300 can use any suitable mechanism to determine the similarity score between the plurality of sentiments and the plurality of keywords. For example, in some embodiments, process 300 can calculate a cosine similarity score between the plurality of sentiments and the plurality of keywords. In some embodiments, any suitable metric can be used to determine the similarity score, such as a correlation (e.g., Pearson's correlation, Spearman's correlation, Kendall's Tau), cosine similarity, Jaccard similarity, Euclidian distance, etc.

In some embodiments, process 300 can determine at block 318 that the similarity of the plurality of sentiments and the plurality of keywords is below a similarity threshold. That is, in some embodiments, process 300 can determine that the plurality of sentiments and the plurality of keywords are not similar at block 318 and process 300 can continue to block 320.

In some embodiments, at block 320, process 300 can add to a cumulative risk score. For example, in some embodiments, process 300 can add a value of "R3", which can be set by any suitable mechanism such as at a user interface discussed above in connection with block 102 of process 100 and FIG. 1.

Alternatively, in some embodiments, at block 318, process 300 can determine that the similarity score meets or exceeds the similarity threshold. In some embodiments, at block 318, process 300 can add a default value to the cumulative risk score before continuing to block 322. For example, in some embodiments, process 300 can add a value of "0", "1", and/or any predetermined value which indicates that the URL carries a lower risk than the value used in block 320 of process 300. In some embodiments, the default value used by process 300 can additionally be set by any suitable mechanism such as at a user interface discussed above in connection with block 102 of process 100 and FIG. 1.

In some embodiments, at block 322, process 300 can identify a corpus of webpages that have similar content to the webpage associated with the URL received at block 302. In some embodiments, process 300 can search any suitable database at block 322, such as an internet search engine, an internal dataset of collected webpages and/or articles, and/or any other suitable searchable dataset. In some embodiments, process 300 can search a database that is populated with webpages and/or articles that have been pre-approved as safe for the brand associated with the advertiser that submitted the URL. For example, in some embodiments, process 300 can search the approval list described above at block 112 of process 100 in connection with FIG. 1. In another example, in some embodiments, process 300 can search any other suitable approval list such as an aggregation of approval lists from multiple instances of process 100 (e.g., for different advertisers). In yet another example, in some embodiments, process 300 can search a specifically curated database.

In some embodiments, at block 322, process 300 can use the plurality of sentiments and/or plurality of keywords determined at block 316 as search terms. For example, in some embodiments, process 300 can input each sentiment in the plurality of sentiments as a search term to query a database of content. Continuing this example, in some embodiments, when process 300 receives a series of results using a particular sentiment, process 300 can refine the series of results using any suitable additional criteria (e.g., additional sentiments from the plurality of sentiments). As a particular example, in some embodiments, using the sentiments above of {"breadmaking", "family tradition", "recipe", "dough", and "sourdough"}, process 300 can use "family tradition" as a search term in a query through an internet search engine.

In some embodiments, at block 322, process 300 can use a Boolean search string to query a database of content. For example, in some embodiments, process 300 can search a database for two or more sentiments to be present in the same webpage and/or content. Continuing this example, in some embodiments, process 300 can perform any suitable quantity of searches, for example, by iterating the search query using the two or more sentiments until all possible combinations have been searched.

In some embodiments, at block 322, process 300 can score each search query. For example, in some embodiments, process 300 can associate a value (e.g., number of search results) with each search query. That is, in some embodiments, process 300 can perform three searches as follows: "breadmaking", "family tradition", "breadmaking AND family tradition".

In this example, in some embodiments, the third search query is a Boolean search consisting of two of the sentiments that were also searched as individual search queries.

Continuing this example, in some embodiments, process 300 can determine that each search query returns the following number of results from the same database: "breadmaking" returned 1,174 results, "family tradition" returned 3,145 results, and "breadmaking AND family tradition" returned 268 results.

In some embodiments, at block 322, process 300 can collect any suitable quantity (e.g., 5, 20, 100, 1000) of webpages and/or articles to add to the corpus of similar webpages. In some embodiments, each entry in the corpus of similar webpages and/or articles can have any suitable amount of text and/or visual content. In some embodiments, process 300 can search and include webpages and/or articles written in any suitable language, including languages that are different that the language used in the webpage content associated with the URL received at block 302. In some embodiments, each entry in the corpus of similar webpages can additionally have associated keywords, sentiments, tags, classifications, and/or any other suitable metric included with the content of the webpages in the database where process 300 is searching. In some embodiments, process 300 can include the additional associations when including the webpage and/or article in the corpus of similar webpages.

In some embodiments, at block 324, process 300 can generate an individual risk score for each sentiment from the webpage based on the corpus of similar webpages. That is, in some embodiments, process 300 can use the search results from block 322 in any suitable additional analysis. For example, in some embodiments, process 300 can determine that the sentiment of "breadmaking" has an individual risk score of "0" (e.g., low risk) based on the number of search results returned in a database query, wherein the database contained pre-approved safe webpages and/or articles. That is, in this example, the search query of "breadmaking" can return a number of search results above a particular threshold and can be assigned a low risk score. In some embodiments, the particular threshold for search results can be determined by an advertiser, such as in the plurality of risk tolerance values as described above at block 102 of process 100 in connection with FIG. 1 above. In another example, in some embodiments, process 300 can determine that the sentiment of "dough" has an individual risk score of "0.5" based on a relatively low number of search results in the database.

In some embodiments, at block 324, process 300 can use any suitable additional mechanisms to analyze the individual sentiments. For example, in some embodiments, based on the 3,145 results returned with the sentiment of "family traditions", process 300 can determine, from the returned search results, any suitable number of additional sentiments that appear with "family traditions". That is, at block 324 process 300 can determine a graph and/or network of sentiments closely connected to a particular sentiment, and can use the graph and/or network to determine an individual risk score for the particular sentiment.

In some embodiments, process 300 can generate search results for webpages and/or articles containing the determined sentiments from multiple databases, and can use the corresponding search results to determine an individual risk score for a particular sentiment. For example, a particular sentiment can have a first number of search results in a database associated with approved and/or safe webpages and/or articles and a second number of search results in a database associated with excluded and/or unsafe webpages and/or articles. In this example, if the second number of search results (in the unsafe database) is significantly greater than the first number of search results (in the safe database), process 300 can determine that the particular sentiment is "unsafe" and assign a corresponding individual risk score to that particular sentiment.

In some embodiments, at block 326, process 300 can generate a sentiment risk score for the webpage based on the individual risk scores for each sentiment determined at block 324. In some embodiments, process 300 can use any suitable combination of the individual risk scores (e.g., sum, weighted sum). In some embodiments, process 300 can determine a statistical distribution of the individual risk scores for each sentiment and can use the properties of the statistical distribution (e.g., average, median, mode, minimum, maximum) to determine the sentiment risk score for the webpage. In some embodiments, at block 326, process 300 can add the sentiment risk score to the cumulative risk score.

In some embodiments, at block 328, process 300 can determine the cumulative risk score for the URL. In some embodiments, process 300 can check that the risk tolerance values used at blocks 308, 314, and/or 320 (or any combination thereof) were added to the cumulative risk value only when blocks 306, 312, and/or 318 (respectively, or any combination thereof) returned a "no" condition. In some embodiments, process 300 can check that a default risk tolerance value was added to the cumulative risk value only when blocks 306, 312, and/or 318 (respectively, or any combination thereof) returned a "yes" condition. In some embodiments, at block 328, process 300 can communicate the cumulative risk score to any other processes, such as process 100.

Figure 4:
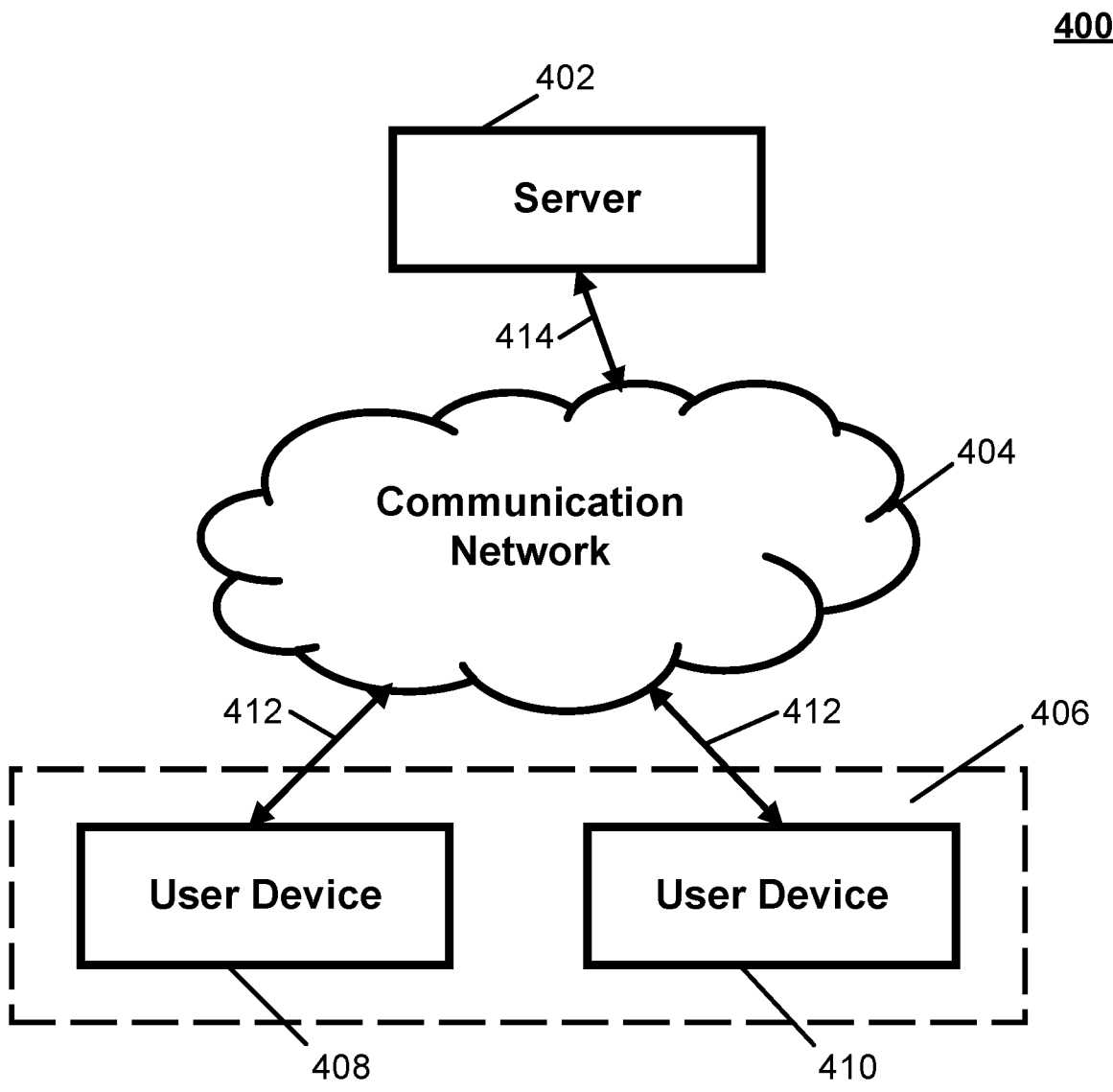
FIG. 4 is an example block diagram of a system that can be used to implement mechanisms described herein in accordance with some embodiments of the disclosed subject matter.

Turning to FIG. 4, an example 400 of hardware for providing digital advertisers with improved context for dynamic webpages in accordance with some implementations is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some implementations, server 402 can perform any suitable function(s). For example, in some embodiments, server 402 can host any suitable website and/or internet-enabled application, such as webpage 202 discussed above in connection with FIG. 2.

Communication network 404 can be any suitable combination of one or more wired and/or wireless networks in some implementations. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for use with process 100. In some implementations, user device 406 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some implementations. For example, in some implementations, multiple devices can be used to implement the functions performed by server 402.

Although two user devices 408 and 410 are shown in FIG. 4 to avoid overcomplicating the figure, any suitable number of user devices, (including only one user device) and/or any suitable types of user devices, can be used in some implementations.

Figure 5:
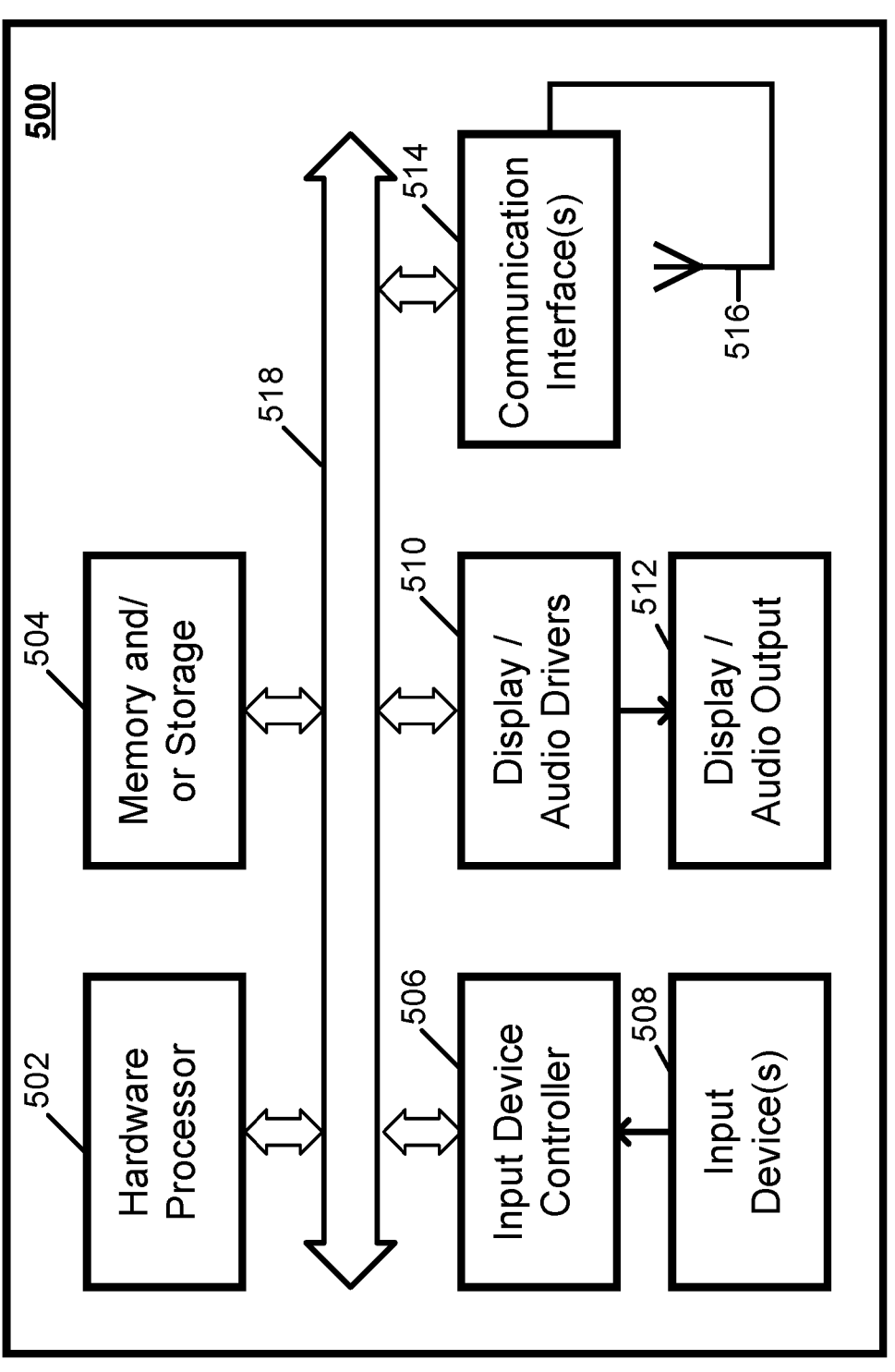
FIG. 5 is an example block diagram of hardware that can be used in a server and/or a user device of FIGS. 1-3 in accordance with some embodiments of the disclosed subject matter.

Server 402 and user devices 406 can be implemented using any suitable hardware in some implementations. For example, in some implementations, devices 402 and 406 can be implemented using any suitable general-purpose computer or special-purpose computer and can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 504, an antenna 516, and a bus 518.

Hardware processor 502 can include any suitable hardware processor, such as a microprocessor, a microcontroller, digital signal processor(s), dedicated logic, and/or any other suitable circuitry for controlling the functioning of a general-purpose computer or a special-purpose computer in some implementations. In some implementations, hardware processor 502 can be controlled by a computer program stored in memory and/or storage 504. For example, in some implementations, the computer program can cause hardware processor 502 to perform functions described herein.

Memory and/or storage 504 can be any suitable memory and/or storage for storing programs, data, documents, and/or any other suitable information in some implementations. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some implementations. For example, input device controller 506 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some implementations. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some implementations. In some implementations, antenna 516 can be omitted.

Bus 518 can be any suitable mechanism for communicating between two or more components 502, 504, 506, 510, and 514 in some implementations.

Any other suitable components can be included in hardware 500 in accordance with some implementations.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of processes 100 and/or 300 can be executed or performed in any order or sequence not limited to the order and sequence shown in and described in connection with FIGS. 1 and 3. Also, some of the above blocks of processes 100 and/or 300 can be executed or performed substantially simultaneously where appropriate or in parallel to reduce latency and processing times. Additionally or alternatively, some of the above described blocks of processes 100 and/or 300 can be omitted.

Accordingly, methods, systems, and media for providing digital advertisers with improved context for dynamic webpages are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for providing contextual information associated with webpages, the method comprising:

receiving a plurality of risk tolerance values from a first advertiser;

accessing a first webpage through a first universal resource locator (URL), wherein the first webpage contains at least one dynamic advertising region;

determining, using a machine learning model, (i) whether the first URL is likely to be a cybersquatting attempt of a second URL by parsing the first URL into a plurality of URL components and performing a pattern matching of each of the plurality of URL components against a set of URLS in which a first domain name associated with the first URL is compared to a second domain name associated with the second URL;

(ii) in response to determining that the first URL is likely to be the cybersquatting attempt of the second URL that the first URL is the cybersquatting attempting of the second URL based on the pattern matching, whether the first URL is associated with a valid identity certificate by inspecting the first webpage associated with the first URL;

(iii) in response to determining that the first URL is associated with the valid identity certificate, a first plurality of sentiments associated with content items within the first webpage, a plurality of keywords associated with the first webpage, and a similarity score between the first plurality of sentiments and the plurality of keywords; and (iv) a plurality of sentiment risk scores, wherein a sentiment risk score for at least one sentiment in the first plurality of sentiment risk scores is based on searching an approval list using at least one of the first plurality of sentiments as a search query;

based on determining that the first URL is the cybersquatting attempt of the second URL, modifying an aggregate risk score by a first value from the plurality of risk tolerance values;

based on determining that the similarity score is below a similarity threshold, modifying the aggregate risk score by a second value from the plurality of risk tolerance values;

based on the plurality of sentiment risk scores, modifying the aggregate risk score by a third value from the plurality of risk tolerance values;

determining that the aggregate risk score is within a first range of predetermined values; and in response to determining that the aggregate risk score is within the first predetermined range of values, associating at least one of the first webpage or the first domain name associated with the first URL with an exclusion list associated with the first advertiser.

2. The method of claim 1, wherein the method further comprises inhibiting the first advertiser from placing a bid for advertising in the at least one dynamic advertising region based on at least one of the first webpage or the first domain name being included on the exclusion list.

3. The method of claim 1, wherein the method further comprises inhibiting the first advertiser from placing a bid for advertising on a second webpage based on at least one of the first webpage and the domain name associated with the first URL being on the exclusion list, wherein the second webpage is accessed at a third URL, wherein the domain name associated with the first URL is identical to a domain name associated with the third URL.

4. The method of claim 1, wherein the method further comprises, based on at least one of the first webpage and the domain name associated with the first URL being on the exclusion list, adding the first plurality of sentiments associated with the first webpage and the first webpage to a training dataset for the machine learning model.

5. The method of claim 1, wherein the approval list comprises a database of web content that is approved by the first advertiser.

6. A system for providing contextual information associated with webpages, the system comprising:

a hardware processor that is configured to:

receive a plurality of risk tolerance values from a first advertiser;

access a first webpage through a first universal resource locator (URL), wherein the first webpage contains at least one dynamic advertising region;

determine, using a machine learning model, (i) whether the first URL is likely to be a cybersquatting attempt of a second URL by parsing the first URL into a plurality of URL components and performing a pattern matching of each of the plurality of URL components against a set of URLS in which a first domain name associated with the first URL is compared to a second domain name associated with the second URL;

(ii) in response to determining that the first URL is likely to be the cybersquatting attempt of the second URL that the first URL is the cybersquatting attempting of the second URL based on the pattern matching, whether the first URL is associated with a valid identity certificate by inspecting the first webpage associated with the first URL;

(iii) in response to determining that the first URL is associated with the valid identity certificate, a first plurality of sentiments associated with content items within the first webpage, a plurality of keywords associated with the first webpage, and a similarity score between the first plurality of sentiments and the plurality of keywords; and (iv) a plurality of sentiment risk scores, wherein a sentiment risk score for at least one sentiment in the first plurality of sentiment risk scores is based on searching an approval list using at least one of the first plurality of sentiments as a search query;

based on determining that the first URL is the cybersquatting attempt of the second URL, modify an aggregate risk score by a first value from the plurality of risk tolerance values;

based on determining that the similarity score is below a similarity threshold, modify the aggregate risk score by a second value from the plurality of risk tolerance values;

based on the plurality of sentiment risk scores, modify the aggregate risk score by a third value from the plurality of risk tolerance values;

determine that the aggregate risk score is within a first range of predetermined values; and in response to determining that the aggregate risk score is within the first predetermined range of values, associate at least one of the first webpage or the first domain name associated with the first URL with an exclusion list associated with the first advertiser.

7. The system of claim 6, wherein the hardware processor is further configured to inhibit the first advertiser from placing a bid for advertising in the at least one dynamic advertising region based on at least one of the first webpage or the first domain name being included on the exclusion list.

8. The system of claim 6, wherein the hardware processor is further configured to inhibit the first advertiser from placing a bid for advertising on a second webpage based on at least one of the first webpage and the domain name associated with the first URL being on the exclusion list, wherein the second webpage is accessed at a third URL, wherein the domain name associated with the first URL is identical to a domain name associated with the third URL.

9. The system of claim 6, wherein the hardware processor is further configured to, based on at least one of the first webpage and the domain name associated with the first URL being on the exclusion list, add the first plurality of sentiments associated with the first webpage and the first webpage to a training dataset for the machine learning model.

10. The system of claim 6, wherein the approval list comprises a database of web content that is approved by the first advertiser.

11. A non-transitory computer-readable medium containing computer executable instructions that, when executed by a processor, cause the processor to perform a method for providing contextual information associated with webpages, the method comprising:

receiving a plurality of risk tolerance values from a first advertiser;

accessing a first webpage through a first universal resource locator (URL), wherein the first webpage contains at least one dynamic advertising region;

determining, using a machine learning model, (i) whether the first URL is likely to be a cybersquatting attempt of a second URL by parsing the first URL into a plurality of URL components and performing a pattern matching of each of the plurality of URL components against a set of URLS in which a first domain name associated with the first URL is compared to a second domain name associated with the second URL;

(ii) in response to determining that the first URL is likely to be the cybersquatting attempt of the second URL that the first URL is the cybersquatting attempting of the second URL based on the pattern matching, whether the first URL is associated with a valid identity certificate by inspecting the first webpage associated with the first URL;

(iii) in response to determining that the first URL is associated with the valid identity certificate, a first plurality of sentiments associated with content items within the first webpage, a plurality of keywords associated with the first webpage, and a similarity score between the first plurality of sentiments and the plurality of keywords; and based on determining that the first URL is the cybersquatting attempt of the second URL, modifying an aggregate risk score by a first value from the plurality of risk tolerance values;

based on determining that the similarity score is below a similarity threshold, modifying the aggregate risk score by a second value from the plurality of risk tolerance values;

based on the plurality of sentiment risk scores, modifying the aggregate risk score by a third value from the plurality of risk tolerance values;

determining that the aggregate risk score is within a first range of predetermined values; and in response to determining that the aggregate risk score is within the first predetermined range of values, associating at least one of the first webpage or the first domain name associated with the first URL with an exclusion list associated with the first advertiser.

12. The non-transitory computer-readable medium of claim 11, wherein the method further comprises inhibiting the first advertiser from placing a bid for advertising in the at least one dynamic advertising region based on at least one of the first webpage or the first domain name being included on the exclusion list.

13. The non-transitory computer-readable medium of claim 11, wherein the method further comprises inhibiting the first advertiser from placing a bid for advertising on a second webpage based on at least one of the first webpage and the domain name associated with the first URL being on the exclusion list, wherein the second webpage is accessed at a third URL, wherein the domain name associated with the first URL is identical to a domain name associated with the third URL.

14. The non-transitory computer-readable medium of claim 11, wherein the method further comprises, based on at least one of the first webpage and the domain name associated with the first URL being on the exclusion list, adding the first plurality of sentiments associated with the first webpage and the first webpage to a training dataset for the machine learning model.

15. The non-transitory computer-readable medium of claim 11, wherein the approval list comprises a database of web content that is approved by the first advertiser.

* * * * *